United States Patent
Barnes et al.

(10) Patent No.: US 11,023,266 B2
(45) Date of Patent: Jun. 1, 2021

(54) DETECTING AND COUNTERACTING A MULTIPROCESSOR EFFECT IN A VIRTUAL COMPUTING ENVIRONMENT

(71) Applicant: INTERNATIONAL BUSINESS MACHINES CORPORATION, Armonk, NY (US)

(72) Inventors: Andrew P. Barnes, Wicklow (IE); John V. Delaney, Meath (IE); Florian D. Graf, Zurich (CH); Anthony M. Hunt, Hopewell Junction, NY (US); Clea A. Zolotow, Key West, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 506 days.

(21) Appl. No.: 15/596,422

(22) Filed: May 16, 2017

(65) Prior Publication Data

US 2018/0336051 A1 Nov. 22, 2018

(51) Int. Cl.
*G06F 9/455* (2018.01)
*G06F 9/50* (2006.01)
(Continued)

(52) U.S. Cl.
CPC .......... *G06F 9/45558* (2013.01); *G06F 9/466* (2013.01); *G06F 9/5077* (2013.01);
(Continued)

(58) Field of Classification Search
None
See application file for complete search history.

(56) References Cited

U.S. PATENT DOCUMENTS 7,318,128 B1 * 1/2008 Dice .................... G06F 9/5033
711/151
8,572,612 B2 10/2013 Kern
(Continued)

FOREIGN PATENT DOCUMENTS

| CN | 104991815 | 10/2015 |
| CN | 105068874 | 11/2015 |

(Continued)

OTHER PUBLICATIONS

Moses, Jaideep, et al. "Shared resource monitoring and throughput optimization in cloud-computing datacenters." 2011 IEEE International Parallel & Distributed Processing Symposium. IEEE, 2011. (Year: 2011).*

(Continued)

*Primary Examiner* — Lewis A Bullock, Jr.
*Assistant Examiner* — Gilles R Kepnang
(74) *Attorney, Agent, or Firm* — Jay Wahlquist; Andrew D. Wright; Roberts Calderon Safran & Cole, P.C.

(57) ABSTRACT

A computer-implemented method includes: monitoring, by a computing device, computing resource utilization by a plurality of virtual computing components sharing a same kernel; monitoring, by the computing device, transaction counts produced by the plurality of virtual computing components; determining, by the computing device, that the transaction counts increase by less than a threshold number as the computing resource utilization increases; and creating, by the computing device, an additional virtual computing component on a separate kernel based on determining that the transaction counts increase by less than a threshold number as the computing resource utilization increases.

17 Claims, 8 Drawing Sheets

(51) Int. Cl.
  *G06F 9/46* (2006.01)
  *G06F 11/00* (2006.01)
  *H04L 12/24* (2006.01)
  *H04L 12/26* (2006.01)

(52) U.S. Cl.
  CPC .......... *G06F 11/00* (2013.01); *H04L 41/0896* (2013.01); *H04L 43/0817* (2013.01); *H04L 43/16* (2013.01); *G06F 2009/4557* (2013.01); *G06F 2009/45562* (2013.01); *G06F 2201/87* (2013.01)

(56) References Cited

U.S. PATENT DOCUMENTS

| | | | | |
|---|---|---|---|---|
| 9,760,400 | B1* | 9/2017 | Emelyanov | G06F 9/4856 |
| 9,792,150 | B1* | 10/2017 | Rangari | G06F 9/4856 |
| 10,120,714 | B1* | 11/2018 | Cabrera | G06F 9/50 |
| 10,360,150 | B2* | 7/2019 | Karthikesan | G06F 12/0806 |
| 10,362,110 | B1* | 7/2019 | Matylitski | H04L 67/1097 |
| 2002/0057803 | A1 | 5/2002 | Loos et al. | |
| 2009/0235267 | A1* | 9/2009 | McKinney | G06F 11/328 |
| | | | | 718/104 |
| 2011/0145637 | A1* | 6/2011 | Gray | G06F 11/141 |
| | | | | 714/15 |
| 2012/0137289 | A1* | 5/2012 | Nolterieke | G06F 9/45558 |
| | | | | 718/1 |
| 2012/0192182 | A1* | 7/2012 | Hayward | G06F 9/455 |
| | | | | 718/1 |
| 2012/0210065 | A1* | 8/2012 | Karthikesan | G06F 12/0806 |
| | | | | 711/118 |
| 2013/0198722 | A1* | 8/2013 | Adams | G06F 9/466 |
| | | | | 717/127 |
| 2014/0282522 | A1* | 9/2014 | Daly | G06F 9/45558 |
| | | | | 718/1 |
| 2016/0196157 | A1* | 7/2016 | Kodama | H04L 43/04 |
| | | | | 718/1 |
| 2016/0316014 | A1* | 10/2016 | Radu | G06F 16/2246 |
| 2016/0378519 | A1* | 12/2016 | Gaurav | G06F 9/505 |
| | | | | 718/1 |
| 2016/0378545 | A1* | 12/2016 | Ho | G06F 9/46 |
| | | | | 718/107 |
| 2017/0257424 | A1* | 9/2017 | Neogi | G06F 9/5044 |
| 2017/0373940 | A1* | 12/2017 | Shahab | H04L 47/70 |

FOREIGN PATENT DOCUMENTS

| | | |
|---|---|---|
| CN | 105119913 | 12/2015 |
| WO | 0186882 | 11/2001 |

OTHER PUBLICATIONS

Shen, Hao et al. "Chip Multiprocessor Performance Modeling for Contention Aware Task Migration and Frequency Scaling." 2015. Journal of Low Power Electronics 11.3 (2015): 263-277. (Year: 2015).*

Gunther, "Understanding the MP Effect: Multiprocessing in Pictures", 1996, Mountain View, CA, 12 pages.

Mell et al., "The NIST Definition of Cloud Computing", NIST, Special Publication 800-145, Sep. 2011, 7 pages.

* cited by examiner

DETECTING AND COUNTERACTING A MULTIPROCESSOR EFFECT IN A VIRTUAL COMPUTING ENVIRONMENT

BACKGROUND

The present invention generally relates to creating a virtual image on a separate kernel, and, more particularly, to creating a virtual image on a separate kernel based on monitoring the computing resource utilization of currently instantiated virtual images.

In a virtual computing system, a single kernel may be shared among multiple virtual containers, images, operating systems, and applications. Application instances or containers may be added to provide additional capacity and compensate for additional load during high traffic times. As an example, a container or application instance may be added for a financial processing application that experiences higher volume close to a deadline (e.g., a financial document filing deadline).

The scalability of the instantiation of another container for performance or capacity reasons may not add any additional capacity or performance due to the Multi-Processor (MP) effect. Multiprocessor systems, (e.g., mainframes, servers, open systems, etc.) may not deliver linear-scaling capacity. The capacity curve provided by a multiprocessor system may be sublinear due to processing capacity being usurped by the system in order to orchestrate the interaction between physical processors and computational resources. This computational overhead is sometimes referred to as the MP effect and the magnitude of the MP effect may be based on platform architecture and workload characteristics.

SUMMARY

In an aspect of the invention, a computer-implemented method includes: monitoring, by a computing device, computing resource utilization by a plurality of virtual computing components sharing a same kernel; monitoring, by the computing device, transaction counts produced by the plurality of virtual computing components; determining, by the computing device, that the transaction counts increase by less than a threshold number as the computing resource utilization increases; and creating, by the computing device, an additional virtual computing component on a separate kernel based on determining that the transaction counts increase by less than a threshold number as the computing resource utilization increases.

In an aspect of the invention, there is a computer program product for counteracting a multiprocessor effect, the computer program product comprising a computer readable storage medium having program instructions embodied therewith. The program instructions executable by a computing device to cause the computing device to: monitor computing resource utilization by a plurality of virtual computing components sharing a same kernel; monitor transaction counts produced by the plurality of virtual computing components; detect the presence of the multiprocessor effect based on the monitoring of the computing resource utilization and the transaction counts; and create an additional virtual computing component on a separate kernel based on the detecting the presence of the multiprocessor effect.

In an aspect of the invention, a system includes: a CPU, a computer readable memory and a computer readable storage medium associated with a computing device; program instructions to monitor computing resource utilization by a plurality of virtual computing components sharing a same kernel; program instructions to monitor transaction counts produced by the plurality of virtual computing components; program instructions to detect that a multiprocessor effect has exceeded a threshold based on the monitoring of the computing resource utilization and the transaction counts; and program instructions to create an additional virtual computing component on a separate kernel based on detecting that the multiprocessor effect has exceeded a threshold. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to creating a virtual image on a separate kernel, and, more particularly, to creating a virtual image on a separate kernel based on monitoring the computing resource utilization in relation to transaction counts produced by virtual computing components. In a distributed computing environment, virtual computing components (e.g., virtual images, virtual containers, application instances, etc.), hosted by a virtual computing server, may be deployed in response to capacity needs. As an example, a virtual container server may identify that a financial processing application is being heavily utilized (e.g., at a time nearing a financial document submission deadline) and will deploy more application instances (e.g., residing within new virtual containers or virtual images) to process more submissions. At a certain point, due to the multiprocessor (MP) effect, these application instances may not perform adequately (e.g., the number of transactions produced by the virtual computing components may be inadequate). Accordingly, aspects of the present invention may identify when additional application instances or other virtual computing components are performing inadequately (e.g., as a result of the MP effect), and may redeploy additional virtual computing components on a separate kernel. As a result, application performance may be improved by preventing the MP effect from adversely affecting the application.

As described herein, aspects of the present invention may detect the presence of the MP effect based on tracking transaction counts (e.g., the number of transactions produced by applications running on virtual computing components) with computing resource utilization. In particular, aspects of the present invention may detect when transaction counts stay the same or reduce as resource utilization increases. As described herein, transaction counts staying the same or reducing as resource utilization increases may indicate the presence of the MP effect in which an excessive number of virtual computing components share the same kernel and cause a spinning process or a multi-processor management process to consume a level of resources that causes the transaction counts to decrease or remain the same. Similarly, aspects of the present invention may detect the MP effect when transaction counts increase as resource utilization increases, but at a slower than a threshold rate (e.g., indicating that a multi-processor management process is consuming resources that only allow transaction counts to increase at a relatively slow rate). Also, aspects of the present invention may detect when transaction counts decrease (or increase at less than a threshold number) after the instantiation of a new virtual computing component (indicating that instantiating the new virtual computing component triggers the presence of the MP effect). In embodiments, creating a new virtual computing component on a separate kernel may increase the efficiency of an application to produce transactions per unit of computing resource utilization. In other words, creating a new virtual computing component on a separate kernel reduces the amount of "overhead" consumed in managing a multi-processor system such that more computing resources are directed to the production of transactions.

In embodiments, existing application instances may be moved to a new virtual computing component instantiated on a separate kernel, and new instances may also be instantiated on the new virtual computing component. Further, aspects of the present invention may continue to add application instances and/or other virtual computing components on to the same kernel until a new kernel is needed. In other words, aspects of the present invention may only instantiate a new virtual computing component on a separate kernel when needed (e.g., when the MP effect becomes too large). In this way, additional kernels are not unnecessarily used until needed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
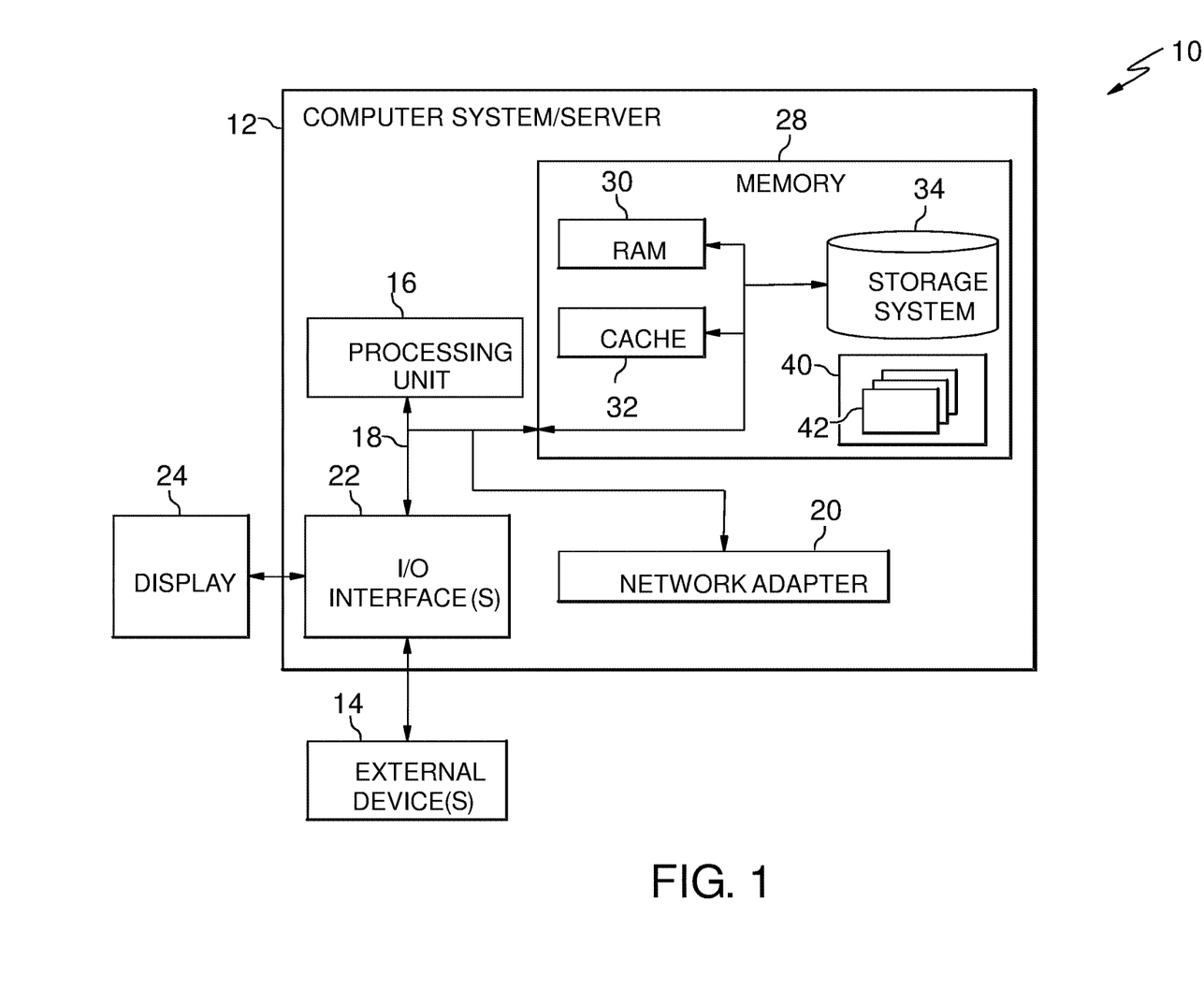
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
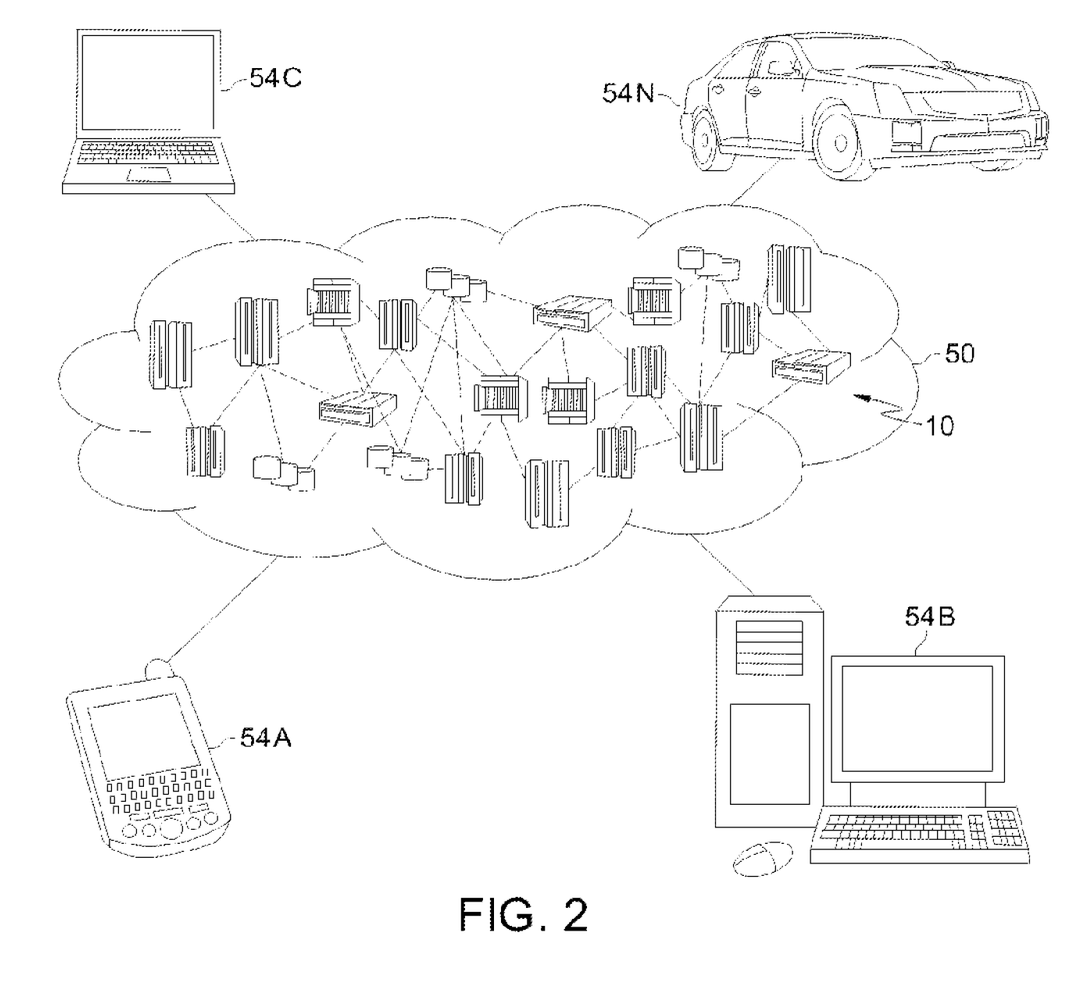
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
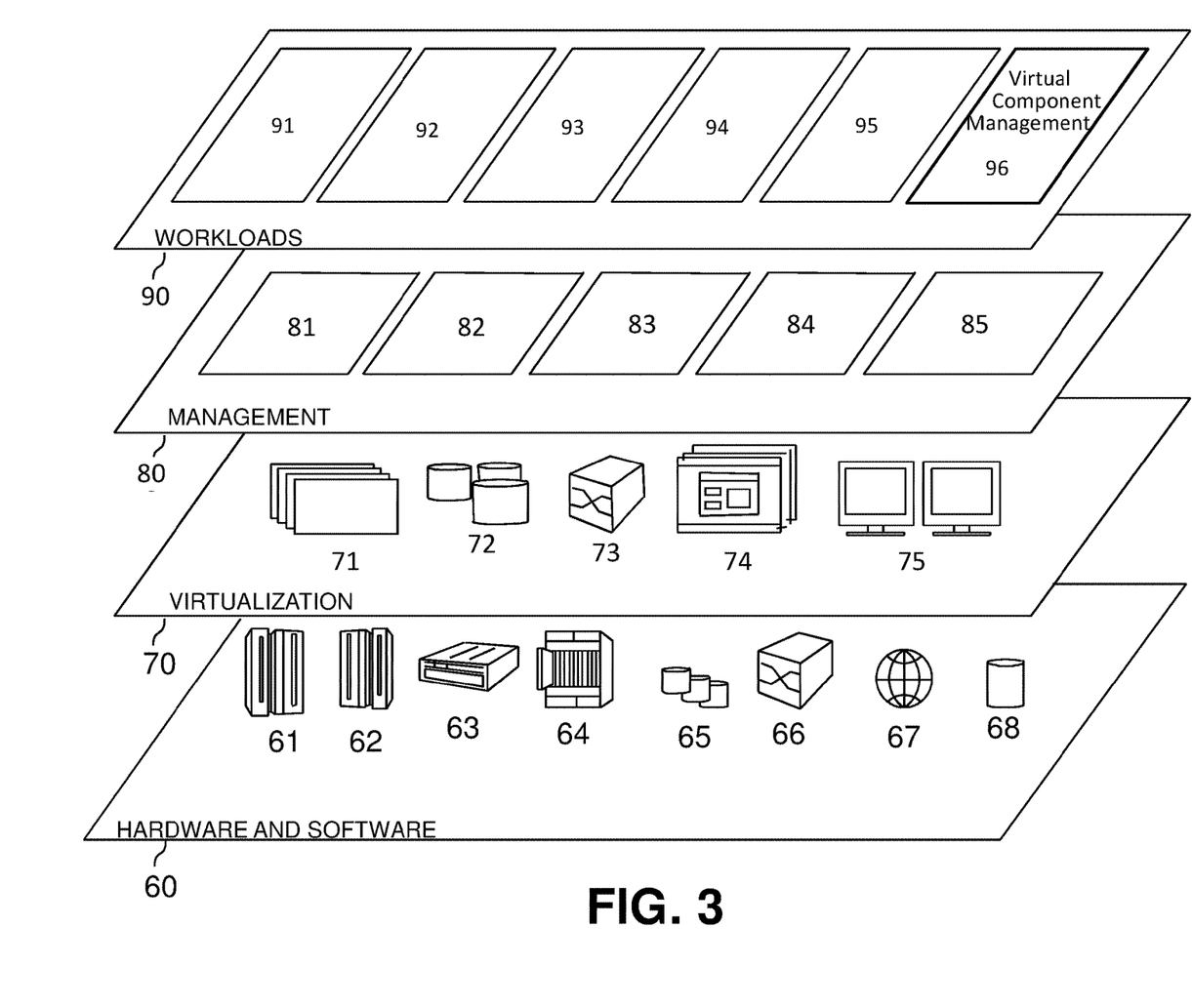
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual component management 96.

Referring back to FIG. 1, the program/utility 40 may include one or more program modules 42 that generally carry out the functions and/or methodologies of embodiments of the invention as described herein (e.g., such as the functionality provided by virtual component management 96). Specifically, the program modules 42 may monitor computing resource utilization on a shared kernel by virtual computing components sharing the kernel, deploy a new virtual computing component when the resource utilization exceeds a threshold, determine whether a transaction account after deploying the new virtualization component is less than equal to the transaction count before deploying the new virtualization component (e.g., indicating the presence of the MP effect), and create a new virtual computing component on a separate kernel based on detecting the presence of the MP effect. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a virtual computing management device 215 as shown in FIGS. 4A and 4B.

Figure 4A:
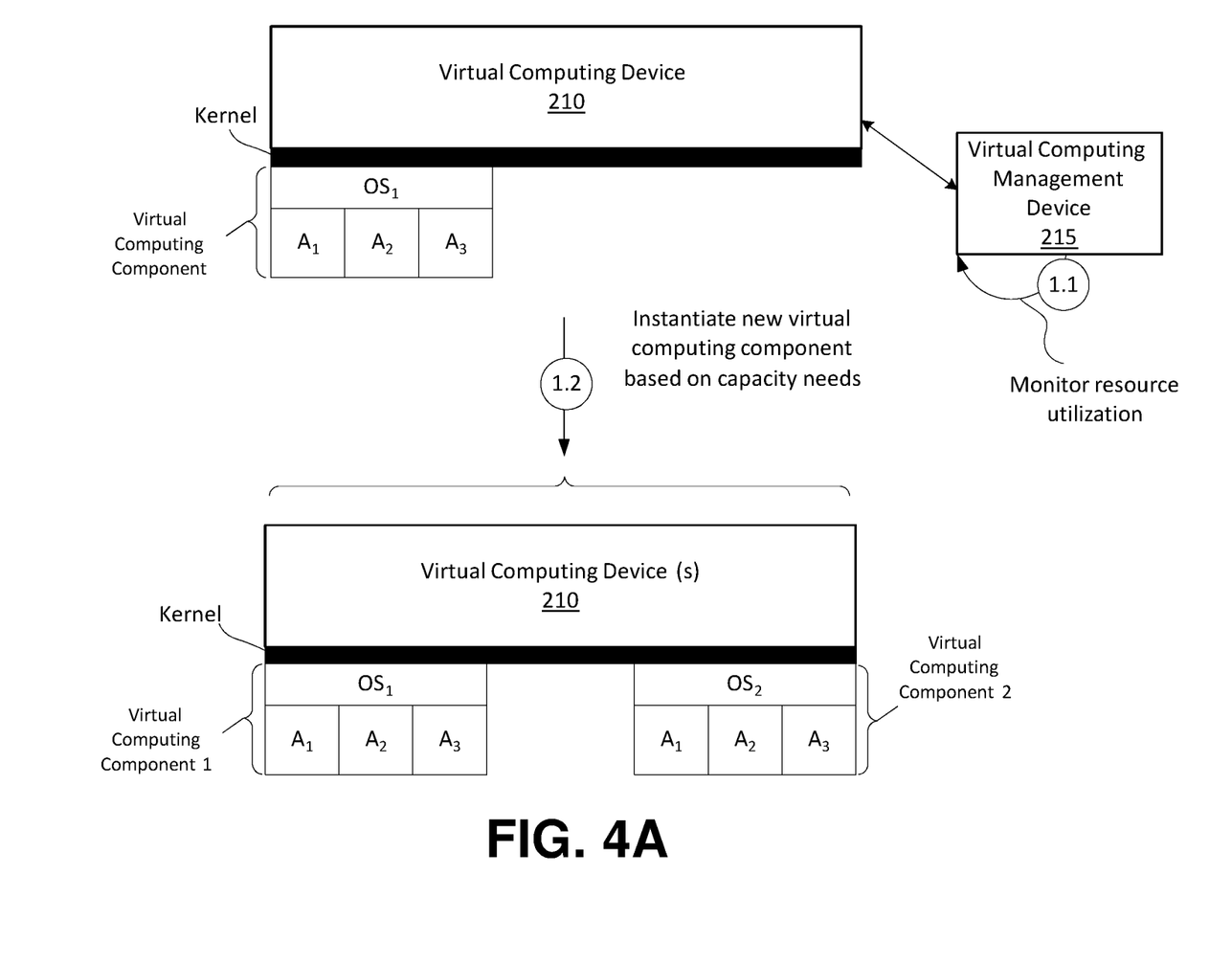
FIGS. 4A-4B show an overview of an example implementation in accordance with aspects of the present invention
Figure 4B:
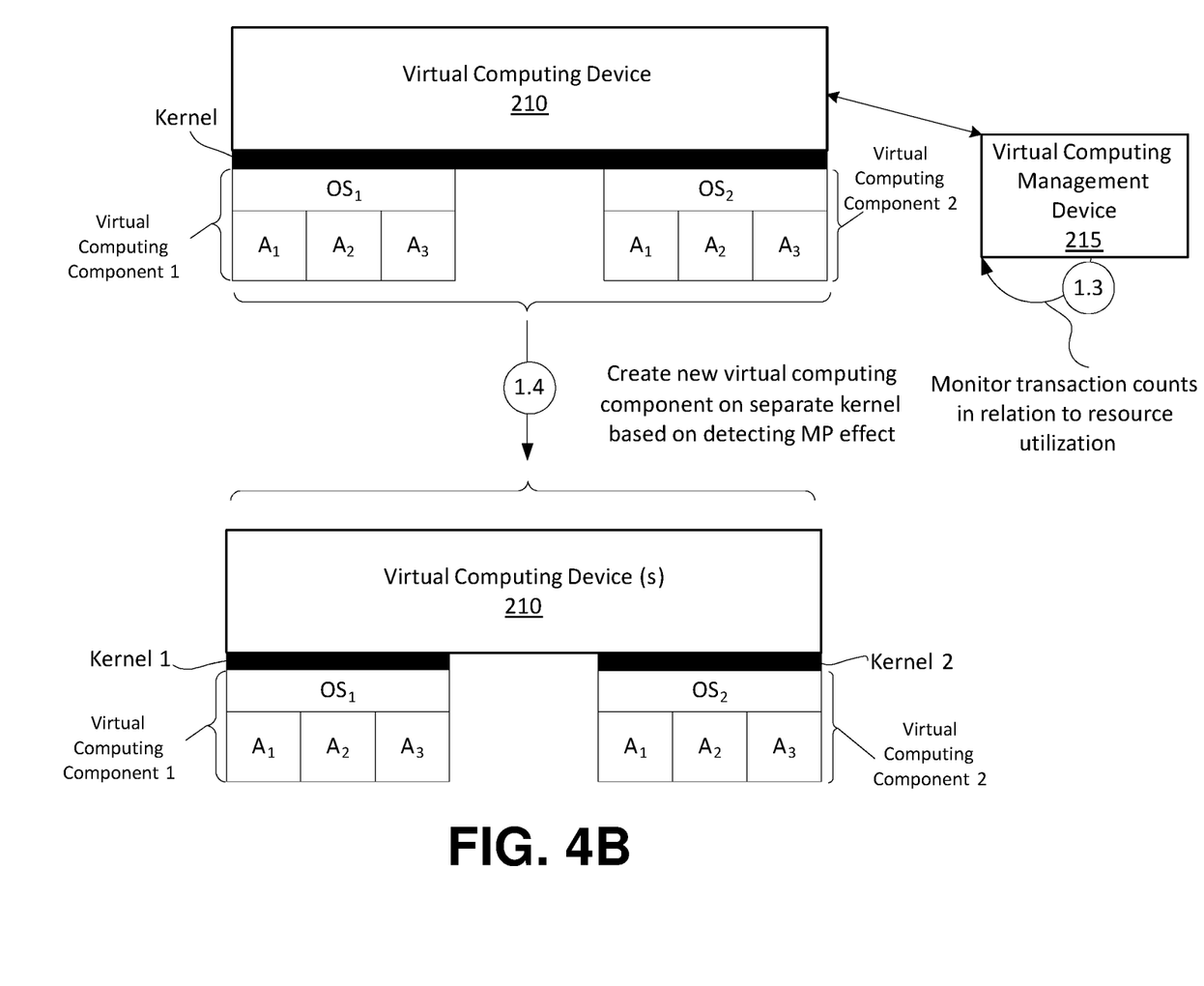

FIGS. 4A and 4B show an overview of an example implementation in accordance with aspects of the present invention. As shown in FIG. 4A, a virtual computing device 210 may host a virtual computing component (e.g., a virtual image with an operating system (OS) instance) on a kernel. The OS (e.g., $OS_1$) may host a number of applications $A_1$, $A_2$, and $A_3$ (e.g., in an application container). Additional virtual computing components may be added as capacity needs increase. For example, the virtual computing device 210 may include a virtual computing management device 215 that monitors resource utilization, such as CPU and I/O utilization (at step 1.1). At step 1.2, the virtual computing management device 215 may instantiate a new virtual computing component (e.g., a virtual image with $OS_2$) based on the capacity needs (e.g., based on the resource utilization exceeding thresholds). The virtual computing management device 215 may host the previously instantiated virtual computing component (virtual computing component 1) and the new virtual computing component (virtual computing component 2) on the same kernel.

In accordance with aspects of the present invention, the virtual computing management device 215 may detect the presence of the MP effect based on adding additional virtual computing components that share the same kernel. Based on detecting the presence of the MP effect, the virtual computing management device 215 may add subsequent virtual computing components to a new separate kernel. Additionally, the virtual computing management device 215 may move the most recently added virtual computing component to the separate kernel.

Referring to FIG. 4B, the virtual computing device 210 may monitor the transaction counts (at step 1.3) in relation to the resource utilization to determine whether the transaction counts are staying the same or decreasing as the resource utilization is increasing. As described herein, the transaction counts staying the same or decreasing as the resource utilization is increasing may indicate the presence of the MP effect, as described herein. For example, transaction counts staying the same or decreasing as the resource utilization is increasing may be the result of a spinning process or other multi-processors management function resulting from the MP effect. Also, the MP effect may be detected when the transaction counts increases less than a threshold number after the addition of the new virtual computing component (indicating that the new virtual computing component is not producing additional transactions or that the number of additional transactions produced is insufficient based on the threshold). Accordingly, the virtual computing management device 215 may generate a new virtual computing component on a separate kernel (e.g. kernel 2) to alleviate or counteract the MP effect (at step 1.4).

In embodiments, the virtual computing management device 215 may move the most recently instantiated virtual computing component (e.g., virtual computing component 2) to the separate kernel (e.g., kernel 2) and may direct subsequently instantiated virtual computing components to be instantiated on the separate kernel. In embodiments, the separate kernel may be hosted by the same virtual computing device 210 that hosted virtual computing component 1, or the separate kernel may be hosted by a different and separate virtual computing device 210. The original kernel (e.g., kernel 1) may continue to host virtual computing component 1.

In the example shown, two virtual computing components are shown for clarity and the MP effect is detected after the instantiation of two virtual computing components sharing a single kernel. In practice, the MP effect may not be realized until dozens of virtual computing components are instantiated on a single kernel. In this way, new kernels are used only once the MP effect is realized, and virtual computing components sharing the same kernel may continue to be added until the MP effect is detected. As such, computing resources are conserved in relation to when a new kernel is used to host each individual virtual computing component.

In the example shown in FIGS. 4A and 4B, the added virtual computing component (e.g., virtual computing component 2) includes a virtual image with a new OS instance (e.g., $OS_2$) hosting a group of application instances. In practice, the added virtual computing component may include a new application instance added to an existing OS (e.g., $OS_1$). The virtual computing management device 215 may detect the presence of the MP effect after adding the application instance, and may generate, on a separate kernel a new virtual computing component having a new virtual image with a new OS instance (e.g., $OS_2$) hosting a group of application instances.

Figure 5:
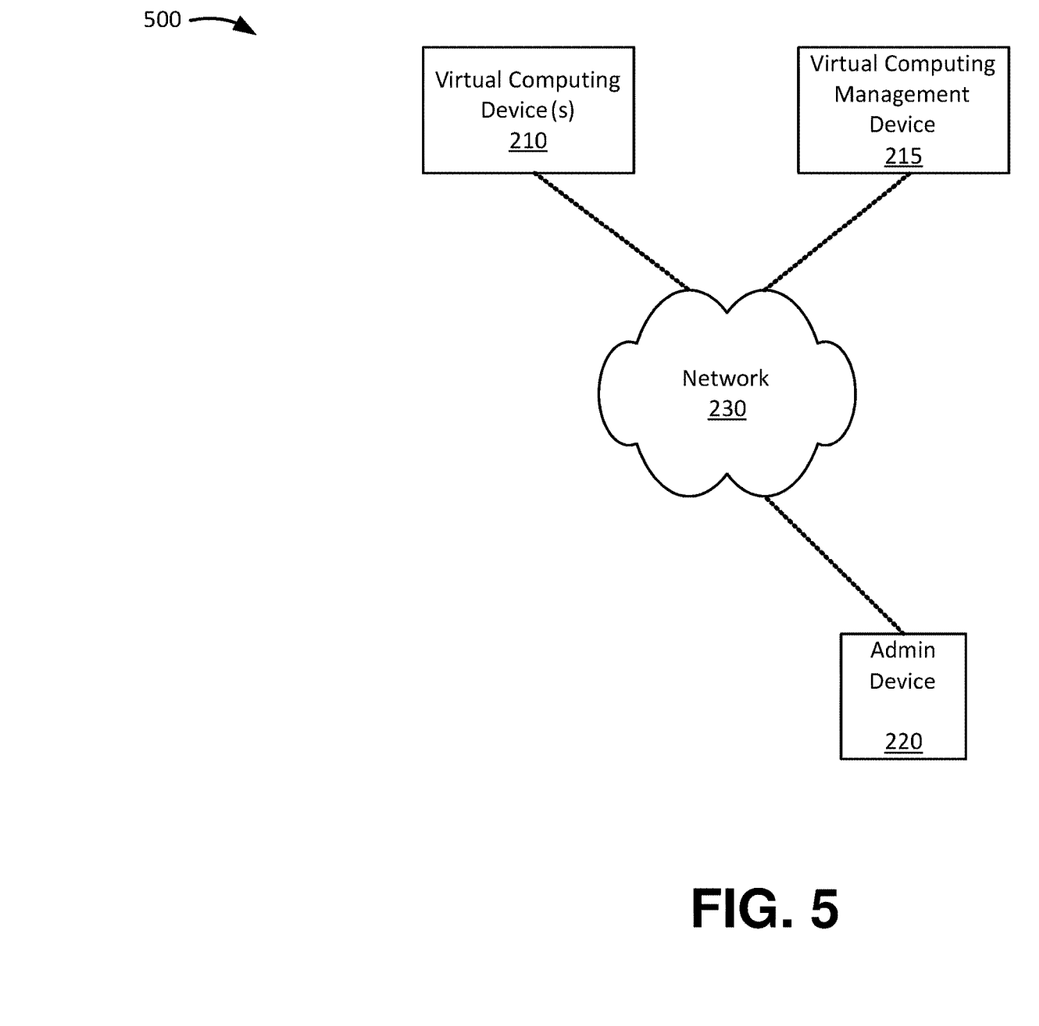
FIG. 5 shows an example environment in accordance with aspects of the present invention.

FIG. 5 shows an example environment in accordance with aspects of the present invention. As shown in FIG. 5, environment 500 may include virtual computing devices 210, a virtual computing management device 215, an admin device 220, and network 230. In embodiments, one or more components in environment 500 may correspond to one or more components in the cloud computing environment of FIG. 2. In embodiments, one or more components in environment 500 may include the components of computer system/server 12 of FIG. 1.

The virtual computing device 210 may include one or more computing devices (e.g., such as computer system/server 12 of FIG. 1) that hosts one or more virtual computing components. For example, as described with respect to FIGS. 4A and 4B, the virtual computing device 210 may include a host OS, hypervisor, docker engine, and/or other components to host and instantiate virtual computing components. In embodiments, the virtual computing device 210 may host and instantiate virtual computing components, such as application instances, application containers, virtual images, virtual instances, docker management systems, or the like. In embodiments, the virtual computing device 210 may implement a single kernel, or may implement multiple kernels.

The virtual computing management device 215 may include one or more computing devices (e.g., such as computer system/server 12 of FIG. 1) that monitors resource utilization by virtual computing components shared by the same kernel on the virtual computing device 210. As described with respect to FIGS. 4A and 4B, the virtual computing management device 215 may instantiate a new virtual computing component based on resource utilization and determining that resource utilization may be alleviated by adding a new virtual computing component. Additionally, or alternatively, the virtual computing management device 215 may instantiate a new virtual computing component based on receiving an instruction from the admin device 220. The virtual computing management device 215 may monitor transaction counts in relation to resource utilization and may detect the presence of the MP effect when the transaction counts stay the same or decrease as resource utilization increases. Based on detecting the MP effect, the virtual computing management device 215 may instantiate a new virtual computing component (e.g., a new virtual image with an OS hosting a group of applications) to a new separate kernel. As described herein, the new virtual computing component on the separate kernel may be hosted by the same virtual computing device 210 that hosted an existing virtual computing component or may be hosted on a separate virtual computing device 210.

The admin device 220 may include one or more computing devices (e.g., such as computer system/server 12 of FIG. 1) that may receive instructions from an administrator to modify the operations of the virtual computing devices 210 and/or the virtual computing management device 215. In embodiments, the admin device 220 may host a user interface to receive instructions for adding a new virtual computing component to a virtual computing device 210. Additionally, or alternatively, the admin device 220 may receive other types of management instructions of for managing and/or modifying the operations and functions performed by the virtual computing devices 210.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
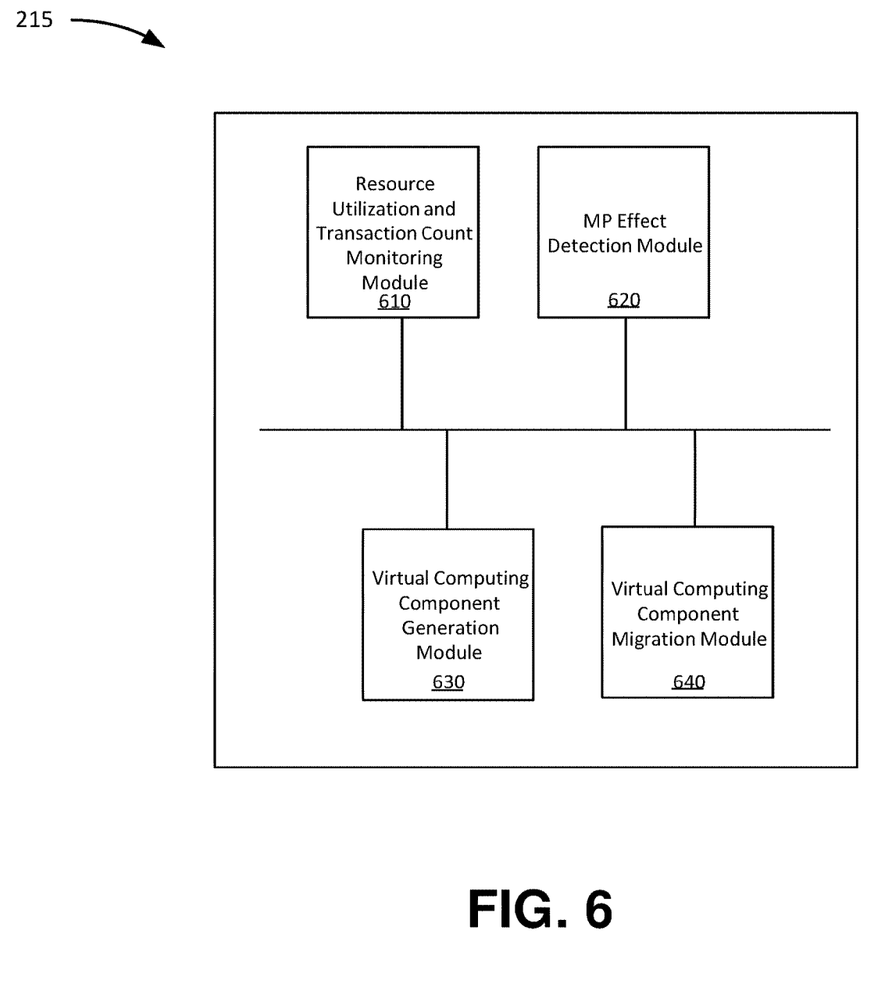
FIG. 6 shows a block diagram of example components of a virtual computing management system in accordance with aspects of the present invention.

FIG. 6 shows a block diagram of example components of a virtual computing management device 215 in accordance with aspects of the present invention. As shown in FIG. 6, the virtual computing management device 215 may include a resource utilization and transaction count monitoring module 610, a MP effect detection module 620, a virtual computing component generation module 630, and a virtual computing component migration module 640. In embodiments, the virtual computing management device 215 may include additional or fewer components than those shown in FIG. 6. In embodiments, separate components may be integrated into a single computing component or module. Additionally, or alternatively, a single component may be implemented as multiple computing components or modules.

The resource utilization and transaction count monitoring module 610 may include a program module (e.g., program module 42 of FIG. 1) that monitors resource utilization (e.g., CPU resource utilization, I/O resource utilization, and/or other computing resource utilization) on a kernel shared by one or more virtual computing components on a virtual computing device 210. The resource utilization and transaction count monitoring module 610 may also monitor transaction counts produced by the virtual computing components.

The MP effect detection module 620 may include a program module (e.g., program module 42 of FIG. 1) that generates and instantiates virtual computing components (e.g., on a virtual computing device 210). In embodiments, the MP effect detection module 620 may instantiate a virtual computing component on a virtual computing device 210 based on the capacity needs of applications hosted by the virtual computing device 210 (e.g., in which the capacity needs may be represented by the resource utilization). For example, the MP effect detection module 620 may instantiate a virtual computing component on a virtual computing device 210 based on determining that the resource utilization exceeds a threshold. Additionally, or alternatively, the MP effect detection module 620 may instantiate a virtual computing component based on receiving an instruction from an administrator via the admin device 220. As described herein, the MP effect detection module 620 may generate a virtual computing component on a separate kernel based on receiving an instruction from the virtual computing component generation module 630 (e.g., when the virtual computing component generation module 630 detects the MP effect). The MP effect detection module 620 may determine which virtual computing device 210 (of multiple virtual computing devices 210) and which kernel to instantiate virtual computing components (e.g., based on the capacity requirements of the virtual computing component, network topology information, load balancing techniques, etc.).

The virtual computing component generation module 630 may include a program module (e.g., program module 42 of FIG. 1) that detects the presence of the MP effect based on resource utilization and transaction count information obtained and monitored by the resource utilization and transaction count monitoring module 610. As described herein, the virtual computing component generation module 630 may detect the presence of the MP effect when transaction counts are staying the same or reducing as resource utilization increases. As described herein, transaction counts staying the same or reducing as resource utilization increases may indicate a spinning process or that a multi-processor management process is consuming a level of resources that causes the transaction counts to decrease or remain the same. In embodiments, the virtual computing component generation module 630 may detect the presence of the MP effect even when transaction counts increase as resource utilization increases, but at a slower than a user-configurable threshold rate (e.g., indicating that a multi-processor management process is consuming resources that only allow transaction counts to increase at a relatively slow rate). In embodiments, the virtual computing component generation module 630 may detect the presence of the MP effect when transaction counts decrease (or increase at less than a user-configurable threshold number) after the instantiation of a new virtual computing component (indicating that instantiating the new virtual computing component triggers the presence of the MP effect). Based on detecting the MP effect, the virtual computing component generation module 630 may instruct the MP effect detection module 620 to instantiate a new virtual computing component on a separate kernel.

The virtual computing component migration module 640 may include a program module (e.g., program module 42 of FIG. 1) that may move or migrate one virtual computing component to another virtual computing component. For example, the virtual computing component migration module 640 may migrate the last virtual computing component added to a kernel to a new virtual computing component instantiated on a new kernel (e.g., when the last virtual computing component triggered the MP effect). Additionally, or alternatively, the virtual computing component migration module 640 may migrate virtual computing components based on other factors (e.g., load-balancing techniques, network topology changes, administrator instructions received from the admin device 220, etc.).

Figure 7:
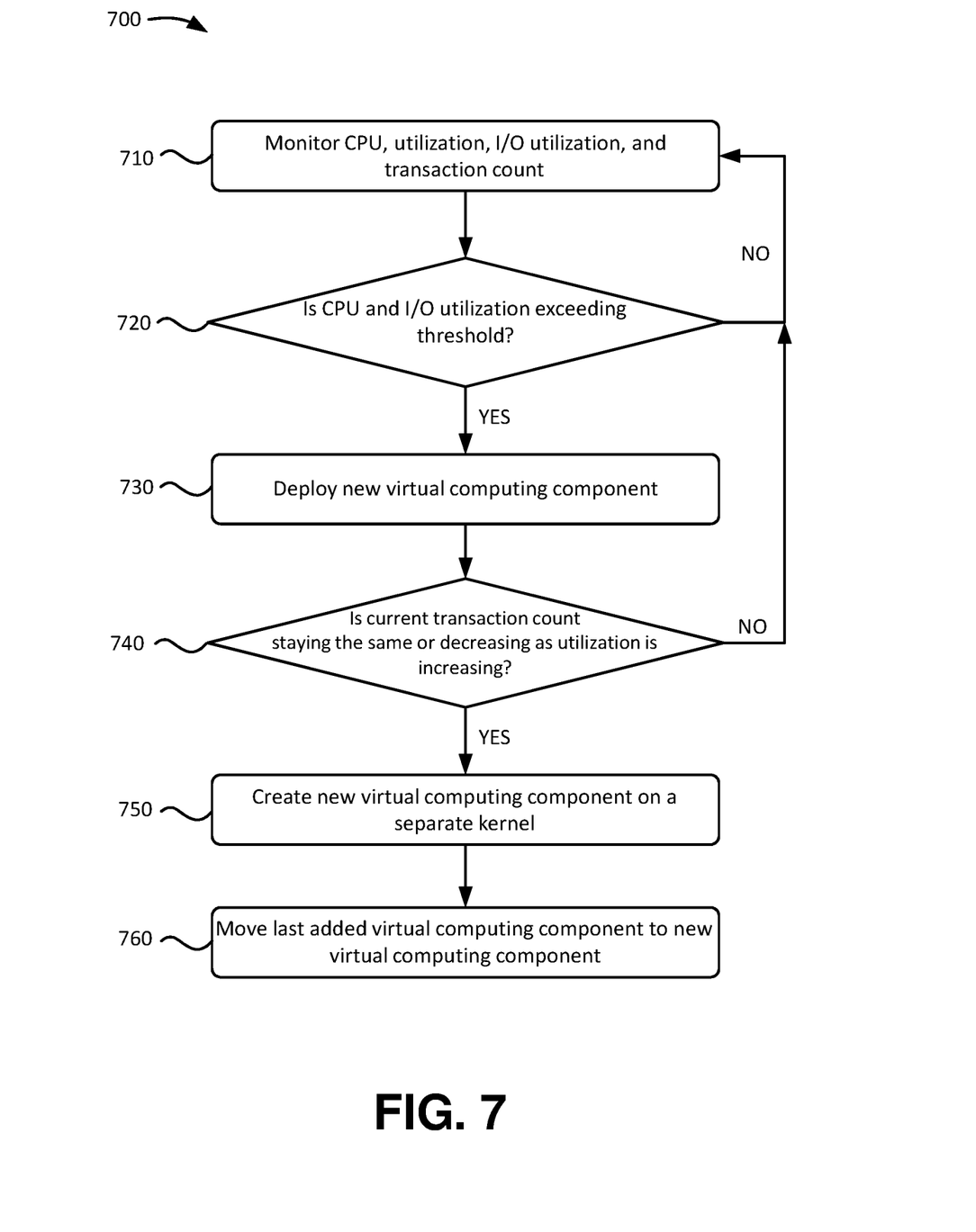
FIG. 7 shows an example flowchart of a process for detecting the presence of the MP effect and instantiating a new virtual computing component on a new kernel to counteract the MP effect in accordance with aspects of the present invention.

FIG. 7 shows an example flowchart of a process for detecting the presence of the MP effect and instantiating a new virtual computing component on a new kernel to counteract the MP effect in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include monitoring CPU utilization, I/O utilization, and transaction counts (step 710). For example, as described above with respect to the resource utilization and transaction count monitoring module 610 the virtual computing management device 215 may monitor resource utilization (e.g., CPU resource utilization, I/O resource utilization, and/or other computing resource utilization) on a kernel shared by one or more virtual computing components on a virtual computing device 210. The virtual computing management device 215 may also monitor transaction counts produced by the virtual computing components. The virtual computing management device 215 may continue to monitor the CPU utilization, I/O utilization, and transaction counts throughout process 700.

Process 700 may also include determining whether the CPU and I/O utilization exceed a threshold (step 720). For example, as described above with respect to the MP effect detection module 620, the virtual computing management device 215 may determine whether the CPU and I/O utilization exceed a threshold. If, for example, the CPU and I/O utilization does not exceed the threshold (step 720—NO), process 700 may return to step 710 to continue monitoring the CPU utilization, I/O utilization, and transaction counts.

If, on the other hand, the CPU and I/O utilization exceeds a threshold (step 720—YES), process 700 may include deploying a new virtual computing component on the same kernel (step 730). For example, the virtual computing management device 215 may instantiate (e.g., deploy) a new virtual computing component on the same kernel as that for which the CPU utilization, I/O utilization, and transaction counts is being monitored at step 710.

Process 700 may also include determining whether the current transaction count is increasing at less than a threshold rate as the utilization is increasing (step 740). For example, as described above with respect to the virtual computing component generation module 630, the virtual computing management device 215 may determine whether the current transaction count is increasing at less than a threshold rate (or if the transaction count is decreasing) as the utilization is increasing (e.g., indicating the presence of the MP effect, or that the MP effect has exceeded a particular level). In embodiments, the virtual computing management device 215 may determine whether the current transaction count is increasing at less than a threshold rate as the utilization is increasing at any time, or after instantiating the new virtual computing component on the same kernel (e.g., to determine whether the newly added kernel triggers the MP effect or causes the MP effect to exceed a particular level). For example, the virtual computing management device 215 may compare the transaction counts from before instantiating the virtual computing component on the same kernel (e.g., at step 730) with transaction counts after instantiation the virtual computing component. If the increase in transaction counts is less than a threshold, the virtual computing management device 215 may determine that the MP effect is present or has exceed a certain threshold level.

If, for example, the current transaction count does not increase at less than a threshold rate as the utilization increases (step 740—NO), process 700 may return to step 710 to continue monitoring the utilization and transaction counts. In other words, the virtual computing management device 215 may determine that the MP effect is not yet present or has not yet exceed a threshold level, and will continue to monitor the utilization and transaction counts.

If, on the other hand, the current transaction count increases at less than a threshold rate as the utilization increases (step 740—YES), process 700 may further include creating a new virtual computing component on a separate kernel (step 750). For example, as described above with respect to the virtual computing component generation module 630, the virtual computing management device 215 may create a new virtual computing component on a separate kernel based on determining that the current transaction count increases at less than a threshold rate as the utilization increases (e.g., indicating the presence of the MP effect).

Process 700 may also include moving the virtual computing component last added to the same kernel to the new virtual computing component on the separate kernel (step 760). For example, as described above with respect to the virtual computing component migration module 640, the virtual computing management device 215 may move or migrate the virtual computing component last added to the same kernel (e.g., the virtual computing component created at step 730) to the new virtual computing component on the separate kernel (e.g., the virtual computing component created at step 750). In embodiments, the virtual computing management device 215 may store instructions to instantiate new virtual computing components on the separate kernel for load balancing purposes.

As described herein, aspects of the present invention may identify when additional application instances or other virtual computing components are performing inadequately (e.g., as a result of the MP effect), and may redeploy additional virtual computing components on a separate kernel. As a result, application performance may be improved by preventing the MP effect from adversely affecting the application. Further, aspects of the present invention may continue to add application instances and/or other virtual computing components on to the same kernel until a new kernel is needed. In other words, aspects of the present invention may only instantiate a new virtual computing component on a separate kernel when needed (e.g., when the MP effect becomes too large). In this way, additional kernels are not unnecessarily used until needed.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by a computing device, computing resource utilization by a plurality of virtual computing components sharing a same kernel on a virtual computing device;
    monitoring, by the computing device, transaction counts produced by the plurality of virtual computing components;
    determining, by the computing device, a transaction rate threshold indicating a lowest point of a sublinear capacity curve provided by a number of the plurality of virtual computing components performing transactions on one or more multiprocessors of the computing device;
    for one instance of the transaction count, detecting a multiprocessor effect by:
        comparing the instance of the transaction count to the transaction rate threshold for the one or more multiprocessors; and
        determining whether the instance of the transaction count falls at or below the lowest point of the sublinear capacity curve; and
    in response to determining that the instance of the transaction count falls at or below the lowest point, migrating, by the computing device, a most recently instantiated virtual computing component on the same kernel to a separate kernel on the virtual computing device as a result of the detected multiprocessor effect, wherein the same kernel has a first instance of an operating system, and further wherein the separate kernel has a second instance of the operating system.

2. The method of claim 1, further comprising determining, by the computing device, that the transaction counts increase by less than a threshold number after deploying a virtual computing component on the same kernel as the plurality of virtual computing components sharing a same kernel, wherein the migrating is based on the determining that the transaction counts increase by less than the threshold number after deploying the virtual computing component on the same kernel.

3. The method of claim 1, wherein the separate kernel is on a different virtual computing device from the same kernel shared by the plurality of virtual computing components.

4. The method of claim 1, wherein a service provider at least one of creates, maintains, deploys and supports the computing device.

5. The method of claim 1, wherein the monitoring the computing resource utilization, the monitoring the transaction counts, the determining the transaction rate threshold, and the migrating the most recently instantiated virtual computing component are provided by a service provider on a subscription, advertising, and/or fee basis.

6. The method of claim 1, wherein the computing device includes software provided as a service in a cloud environment.

7. The method of claim 1, further comprising deploying a system for counteracting the multiprocessor effect, comprising providing a computer infrastructure operable to perform the monitoring of the computing resource utilization, the monitoring of the transaction counts, the determining the transaction rate threshold, the determining of the transaction counts that increase by less than a threshold number as the computing resource utilization increases, and the creating of the additional virtual computing component on the separate kernel.

8. The method of claim 1, wherein the virtual computing components migrated to the separate kernel comprise instructions to instantiate new virtual computing components on the separate kernel.

9. The method of claim 1, wherein the computing device is a virtual computing device,
the plurality of virtual computing components each comprise an instance of the operating system,
the same kernel and the separate kernel are hosted on the virtual computing device, and
the virtual computing device comprises a virtual computing management device that performs the monitoring transaction counts.

10. A computer program product for counteracting a multiprocessor effect, the computer program product comprising a computer readable storage medium having program instructions embodied therewith, the program instructions executable by a computing device to cause the computing device to:
monitor computing resource utilization by a plurality of virtual computing components sharing a same kernel;
monitor transaction counts produced by the plurality of virtual computing components;
determine a transaction rate threshold indicating a lowest point of a sublinear capacity curve provided by a number of the plurality of virtual computing components performing transactions on one or more multiprocessors of the computing device;
for one instance of the transaction count, detect a multiprocessor effect by:
comparing the instance of the transaction count to the transaction rate threshold for the one or more multiprocessors; and
determining whether the instance of the transaction count falls at or below the lowest point of the sublinear capacity curve; and
in response to determining that the instance of the transaction count falls at or below the lowest point, migrate a most recently instantiated virtual computing component on the same kernel to a separate kernel based on the detecting the multiprocessor effect,
wherein the same kernel has a first instance of an operating system, and further wherein the separate kernel has a second instance of the operating system.

11. The computer program product of claim 10, wherein the detecting the multiprocessor effect includes determining that the transaction counts increase by less than a threshold number as the computing resource utilization increases.

12. The computer program product of claim 10, wherein the detecting the multiprocessor effect includes determining that the transaction counts remain the same or decrease as the computing resource utilization increases.

13. The computer program product of claim 10, wherein the detecting the multiprocessor effect includes determining that the transaction counts increase by less than a threshold number after instantiating the most recently instantiated virtual computing component on the same kernel.

14. The computer program product of claim 10, wherein the migrating the virtual computing component to the separate kernel increases an efficiency in producing transactions per unit of computer resource utilization.

15. The computer program product of claim 10, wherein the virtual computing components migrated to the separate kernel comprise instructions to instantiate new virtual computing components on the separate kernel.

16. A system comprising:
a CPU, a computer readable memory and a computer readable storage medium associated with a computing device;
program instructions to monitor computing resource utilization by a plurality of virtual computing components sharing a same kernel;
program instructions to monitor transaction counts produced by the plurality of virtual computing components;
program instructions to determine a transaction rate threshold indicating a lowest point of a sublinear capacity curve provided by a number of the plurality of virtual computing components performing transactions on one or more multiprocessors of the computing device;
program instructions to detect, for one instance of the transaction count, a multiprocessor effect by:
comparing the instance of the transaction count to the transaction rate threshold for the one or more multiprocessors; and
determining whether the instance of the transaction count falls at or below the lowest point of the sublinear capacity curve; and
program instructions to migrate, in response to determining that the instance of the transaction count falls at or below the lowest point, a most recently instantiated virtual computing component on the same kernel to a separate kernel as a result of the detected multiprocessor effect,
wherein the same kernel is hosted by a virtual computing device and has a first instance of an operating system,
the separate kernel is hosted on the virtual computing device and has a second instance of the operating system, and the program instructions are stored on the computer readable storage medium for execution by the CPU via the computer readable memory.

17. The system of claim 16, wherein detecting the multiprocessor effect includes determining that the transaction counts increase by less than a threshold number as the computing resource utilization increases.

* * * * *